US008076000B2

(12) United States Patent (10) Patent No.: US 8,076,000 B2
Domine (45) Date of Patent: Dec. 13, 2011

(54) TIE-LAYER MATERIALS FOR USE WITH IONOMER-BASED FILMS AND SHEETS AS SKINS ON OTHER MATERIALS

(75) Inventor: Joseph Dominic Domine, Humble, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 815 days.

(21) Appl. No.: 10/557,949

(22) PCT Filed: May 24, 2004

(86) PCT No.: PCT/US2004/016149
§ 371 (c)(1),
(2), (4) Date: Nov. 22, 2005

(87) PCT Pub. No.: WO2004/016149
PCT Pub. Date: Dec. 9, 2004

(65) Prior Publication Data
US 2007/0003712 A1    Jan. 4, 2007

Related U.S. Application Data

(63) Continuation-in-part of application No. 10/472,871, filed as application No. PCT/US02/08780 on Mar. 21, 2001, now abandoned.

(60) Provisional application No. 60/279,911, filed on Mar. 29, 2001, provisional application No. 60/473,783, filed on May 27, 2003, provisional application No. 60/473,789, filed on May 27, 2003.

(51) Int. Cl.
B32B 27/28    (2006.01)
B32B 27/30    (2006.01)
B32B 27/32    (2006.01)
B32B 27/34    (2006.01)
B32B 27/36    (2006.01)
B32B 27/38    (2006.01)
B32B 27/40    (2006.01)

(52) U.S. Cl. .................. 428/414; 428/423.1; 428/423.3; 428/423.5; 428/423.7; 428/424.4; 428/424.7; 428/424.8; 428/447; 428/474.4; 428/474.7; 428/475.2; 428/476.3; 428/476.9; 428/480; 428/492; 428/521; 428/522; 428/523

(58) Field of Classification Search .............. 428/474.4, 428/475.5, 475.8; 525/519
See application file for complete search history.

(56) References Cited

U.S. PATENT DOCUMENTS

| | | | |
|---|---|---|---|
| 2,714,605 A | 8/1955 | Jones | |
| 2,764,563 A | 9/1956 | McMaster et al. | |
| 3,072,618 A | 1/1963 | Turbak | |
| 3,094,144 A | 6/1963 | Oxley et al. | |
| 3,097,194 A | 7/1963 | Leonard, Jr. et al. | |
| 3,205,285 A | 9/1965 | Turbak et al. | |
| 3,255,130 A | 6/1966 | Keim et al. | |
| 3,264,272 A | 8/1966 | Rees | |
| 3,322,734 A | 5/1967 | Rees | |
| 3,338,734 A | 8/1967 | Goff et al. | |
| 3,355,319 A | 11/1967 | Rees | |
| 3,522,222 A | 7/1970 | Taylor | |
| 3,522,223 A | 7/1970 | Taylor | |
| 4,148,972 A | 4/1979 | Yamane et al. | |
| 4,230,830 A | 10/1980 | Tanny et al. | |
| 4,282,285 A * | 8/1981 | Mohiuddin | 428/315.5 |
| 4,307,211 A | 12/1981 | Ito et al. | |
| 4,320,213 A * | 3/1982 | Woodbrey et al. | 525/179 |
| 4,335,175 A * | 6/1982 | Webb | 428/213 |
| 4,528,326 A | 7/1985 | Dean | |
| 4,569,865 A | 2/1986 | Placek | |
| 4,654,255 A | 3/1987 | Kojima et al. | |
| 4,656,098 A | 4/1987 | Yonekura et al. | |
| 4,678,713 A | 7/1987 | Lancaster et al. | |
| 4,735,855 A * | 4/1988 | Wofford et al. | 428/349 |
| 4,737,548 A | 4/1988 | Kojima et al. | |
| 4,800,129 A | 1/1989 | Deak | |
| 4,800,130 A | 1/1989 | Yonekura et al. | |
| 4,801,649 A | 1/1989 | Statz | |
| 4,849,474 A * | 7/1989 | Gallucci | 525/92 B |
| 4,855,183 A | 8/1989 | Oberle | |
| 4,911,451 A | 3/1990 | Sullivan et al. | |
| 4,943,621 A * | 7/1990 | Janda et al. | 526/127 |
| 4,948,822 A | 8/1990 | Iovine et al. | |
| 4,954,393 A | 9/1990 | Jones | |

(Continued)

FOREIGN PATENT DOCUMENTS

DE    3 626 809    12/1987

(Continued)

OTHER PUBLICATIONS

Pritchard, G. (1998). Plastics Additives—An A-Z Reference. (p. 375-385 ). Springer—Verlag.*
Wunderlich, B. et al., "Encyclopedia of Polymer Science and Engineering", Thermoforming, vol. 16, pp. 807-832, 1989.
Kroschwitz, J. et al., "Concise Encyclopedia of Polymer Science and Engineering", Blow Molding, pp. 90-92, 1990.
Booth, C. et al., "Comprehensive Polymer Science, The Synthesis, Characterization, Reactions & Applications of Polymers," Pergamon Press, vol. 1, pp. 755-772, 1989.
C. Harper, "*Summary of Thermoplastics*" Handbook of Plastics and Elastomers, McGraw-Hill , Inc., Chapter 3, 1992, pp. 3.18-3.25.
"*Periclase*", Hawley's Condensed Chemical Dictionary 13th Edition, ed. R. Lewis, Sr., 1997, pp. 852.
T. Whelan, "*Thermoplastics Melt Processes*", Polymer Technology Dictionary, 1994, pp. 443.

*Primary Examiner* — Callie Shosho
*Assistant Examiner* — John Freeman
(74) *Attorney, Agent, or Firm* — Frank E. Reid; Robert L. Abdon

(57) ABSTRACT

The present invention relates to new combinations of tie-layers and backing layers and/or substrates for making (1) new multilayer structures formed from one or more ionomers and one or more tie-layers, and optionally a backing layer to form laminates, (2) new composite articles made from these laminates in combination with optional substrate materials, and (3) new methods of making composite articles from these laminates by shaping and subsequently contacting them with a substrate material.

17 Claims, No Drawings

U.S. PATENT DOCUMENTS

| | | | |
|---|---|---|---|
| 5,089,332 | A | 2/1992 | Feinberg |
| 5,120,484 | A | 6/1992 | Cloeren |
| 5,137,688 | A * | 8/1992 | DeRudder ............... 422/22 |
| 5,206,294 | A | 4/1993 | Dawson |
| 5,210,138 | A | 5/1993 | Yamamoto et al. |
| 5,281,651 | A | 1/1994 | Arjunan et al. |
| 5,320,905 | A | 6/1994 | Vaughn et al. |
| 5,340,863 | A | 8/1994 | Krutzel |
| 5,352,500 | A * | 10/1994 | Memon ............... 428/35.7 |
| 5,397,833 | A | 3/1995 | Arjunan |
| 5,482,766 | A | 1/1996 | Mathavan et al. |
| 5,491,009 | A * | 2/1996 | Bekele ............... 428/35.7 |
| 5,516,474 | A | 5/1996 | Cloeren |
| 5,543,233 | A | 8/1996 | Latiolais et al. |
| 5,554,698 | A | 9/1996 | Wang et al. |
| 5,631,328 | A | 5/1997 | Wang et al. |
| 5,754,338 | A * | 5/1998 | Wilson et al. ............... 359/530 |
| 5,929,174 | A | 7/1999 | Permentier et al. |
| 5,973,046 | A | 10/1999 | Chen et al. |
| 6,099,685 | A * | 8/2000 | Ito et al. ............... 156/330 |
| 6,138,419 | A | 10/2000 | Sekiguchi et al. |
| 6,242,503 | B1 * | 6/2001 | Kozma et al. ............... 525/193 |
| 6,306,507 | B1 | 10/2001 | Brunelle et al. |
| 6,361,843 | B1 | 3/2002 | Smith et al. |
| 6,413,644 | B2 * | 7/2002 | Ashcraft ............... 428/441 |
| 6,682,825 | B1 | 1/2004 | Kennedy et al. |
| 2001/0003021 | A1 | 6/2001 | Shepard et al. |
| 2001/0008687 | A1 | 7/2001 | Kollaja et al. |
| 2002/0055006 | A1 * | 5/2002 | Vogel et al. ............... 428/520 |
| 2002/0114951 | A1 | 8/2002 | Horansky |
| 2002/0114965 | A1 | 8/2002 | Horansky |
| 2003/0017329 | A1 | 1/2003 | Shah et al. |
| 2004/0076846 | A1 | 4/2004 | Domine et al. |
| 2004/0161623 | A1 | 8/2004 | Domine et al. |
| 2004/0241474 | A1 | 12/2004 | Domine |
| 2004/0241479 | A1 | 12/2004 | Domine et al. |
| 2005/0227022 | A1 | 10/2005 | Domine et al. |
| 2006/0159941 | A1 | 7/2006 | Gini |

FOREIGN PATENT DOCUMENTS

| | | |
|---|---|---|
| EP | 0287839 | 10/1988 |
| EP | 0342897 | 11/1989 |
| EP | 0 481 809 | 4/1992 |
| EP | 0 721 856 | 7/1996 |
| EP | 1279493 | 1/2003 |
| GB | 1011981 | 12/1965 |
| JP | 04 052 136 | 2/1992 |
| JP | 08 269 409 | 10/1996 |
| JP | 2000 85062 | 3/2000 |
| WO | WO 95/11929 | 5/1995 |
| WO | WO 96/23009 | 8/1996 |
| WO | WO 97/02317 | 1/1997 |
| WO | WO 97/11995 | 4/1997 |
| WO | WO 98/52981 | 11/1998 |
| WO | WO 01/78981 | 10/2001 |
| WO | 02/066249 | 8/2002 |
| WO | WO 02/067853 | 9/2002 |
| WO | WO 02/078953 | 10/2002 |
| WO | WO 02/078954 | 10/2002 |
| WO | 2004/106058 | 12/2004 |

* cited by examiner

TIE-LAYER MATERIALS FOR USE WITH IONOMER-BASED FILMS AND SHEETS AS SKINS ON OTHER MATERIALS

CROSS REFERENCE TO RELATED APPLICATIONS

This application is a continuation-in-part of U.S. patent application Ser. No. 10/472,871, filed Apr. 4, 2002, now abandoned which itself is a national stage entry of PCT/US02/08780 filed Mar. 21, 2002 and claims priority to and the benefit of U.S. Prov. App. 60/279,911 filed on Mar. 29, 2001, and this application also claims the benefit of Provisional Application Nos. 60/473,783, filed May 27, 2003, and 60/473,789, filed May 27, 2003.

FIELD OF THE INVENTION

The present invention relates to new combinations of tie-layers and backing layers and/or substrates for making (1) new multilayer structures formed from one or more ionomers and one or more tie-layers, and optionally a backing layer to form laminates, (2) new composite articles made from these laminates in combination with optional substrate materials, and (3) new methods of making composite articles from these laminates by shaping and subsequently contacting them with a substrate material.

BACKGROUND OF THE INVENTION

Durable, glossy fascia associated with articles such as automobiles, luggage, appliances, and other durable articles made from plastics increase both the aesthetic appeal and the utility of these articles. These article attributes are provided, in part, through the incorporation of ionomer materials.

Ionomer materials are known in the art, and are useful in laminates to coat various substrates to form composite articles. See, for example, U.S. Pat. Nos. 5,482,766, 4,148,972, 5,543,233, 4,800,130, 4,656,098, 5,206,294, 4,335,175, U.S. Patent Application Publication No. 2002/0055006 A1, DE 36 26 809 A, EP 0 721 856, JP 08269409, JP 2000085062, JP 04052136, WO 01/8981, WO 02/078953 and WO 02/078954. Ionomer laminates are useful for their scratch and abrasion resistance, as well as toughness and aesthetic appeal. However, with a growing demand for new applications for ionomer laminates and composite articles produced from ionomer laminates, there continues to be a need for new combinations of materials to produce new laminates for the wide array of applications.

The invention fulfills this need by providing for new combinations of tie-layer and backing layer and/or substrate materials that may be used in new ionomer laminates and new composite articles.

SUMMARY OF THE INVENTION

In an embodiment, the invention relates to a composite comprising an ionomer layer, a tie-layer, and a substrate.

In an embodiment, the invention relates to a composite comprising an ionomer layer, a tie-layer, and a substrate wherein the tie-layer is disposed between the ionomer layer and the substrate.

In yet another embodiment, the invention relates to a composite article comprising:
a) an ionomer layer;
b) a tie-layer;
c) a backing layer; and
d) a substrate;
wherein the tie-layer and backing layer are disposed between the ionomer layer and the substrate.

Additionally, the invention also provides for a method of forming a composite article comprising:
(a) forming a laminate;
(b) forming the laminate into a shape, the laminate comprising an ionomer layer contacted to a tie-layer; and
(c) securing a substrate to the tie-layer of the laminate to form the composite article.

In another embodiment, the invention provides for a method of forming a composite article comprising:
(a) coextruding at least two materials to form a laminate;
(b) thermoforming the laminate into a shape, the laminate comprising an ionomer layer contacted to a tie-layer; and
(c) injection molding a substrate layer to the tie-layer of the laminate to form the composite article.

The invention also provides for a composite article formed by the method comprising:
(a) forming a laminate comprising an ionomer layer and a tie-layer;
(b) coextruding the ionomer layer and the tie-layer with a backing layer;
(c) forming a shape from the laminate, resulting in a shaped laminate; and
(d) securing a substrate material to the shaped laminate such that the substrate material is secured to the backing layer.

In any of the previous embodiments, the ionomer layer may include a first ionomer layer and a second ionomer layer.

In the previous embodiments, the first ionomer layer or the second ionomer layer may be pigmented, natural, or clear.

In any of the embodiments, a tie layer may comprise at least one acid-containing polymer; and a backing layer and/or a substrate may comprise at least one polyamide polymer; at least one polyamide compound; at least one polyamide elastomer; or mixtures thereof.

In any of the embodiments, a tie layer may comprise at least one amine-containing polymer; and a backing layer and/or a substrate may comprise at least one nitrogen containing engineering thermoplastic polymer; at least one polyamide polymer; at least one polyamide compound; at least one polyamide elastomer; at least one polyurethane polymer; or at least one polystyrene maleic anhydride; or mixtures thereof.

In any of the embodiments, a tie layer may comprise at least one anhydride-containing polymer; and a backing layer and/or a substrate may comprise at least one engineering thermoplastic polymer; at least one polyamide polymer; at least one polyamide compound; at least one polyamide elastomer; at least one polyester polymer; at least one polyurethane polymer; at least one crosslinked polyester composition; or at least one ethylene vinyl alcohol copolymer; or mixtures thereof.

In any of the embodiments, a tie layer may comprise at least one epoxy-containing polymer; and a backing layer and/or a substrate may comprise at least one engineering thermoplastic polymer; at least one polyamide polymer; at least one polyamide compound; at least one polyamide elastomer; at least one polyester polymer; at least one polyurethane polymer; polystyrene maleic anhydride; at least one crosslinked polyester composition; or at least one ethylene vinyl alcohol copolymer; or mixtures thereof.

In any of the embodiments, a tie layer may comprise at least one ester copolymer; and a backing layer and/or a substrate may comprise at least one polyamide polymer; at least one polyamide compound; at least one polyamide elastomer; at least one acrylic polymer; at least one elastomer; at least one styrenic polymer; at least one copolymer containing cyclic monomer(s); or at least one polyurethane polymer; or mixtures thereof;

In any of the previous embodiments, the tie layer may be selected from any of the materials herein defined.

In any of the previous embodiments, the backing layer and/or substrate, alone or in combination with (blended or layered), may be selected from any of the materials herein defined.

DETAILED DESCRIPTION OF THE INVENTION

Various specific embodiments of the invention will now be described, including exemplary embodiments and definitions that are adopted herein for purposes of understanding the claimed invention. However, for purposes of determining infringement, the scope of the "invention" will refer to the appended claims, including their equivalents, and elements or limitations that are equivalent to those that are recited. Any reference to the "invention" may refer to one or more, but not necessarily all, of the inventions defined by the claims. References to specific "embodiments" are intended to correspond to claims covering those embodiments, but not necessarily to claims that cover more than those embodiments.

As used herein, the term "Groups" or "Group" refers to the new numbering scheme for the Periodic Table Groups as in HAWLEY'S CONDENSED CHEMICAL DICTIONARY 852 (13th ed. 1997).

As used herein, the term "layer" refers to each of the one or more materials, the same or different, in an essentially planar form, that are secured to one another by any appropriate means such as by an inherent tendency of the materials to adhere to one another, or by inducing the materials to adhere as by a heating, radiative, chemical, or some other appropriate process to form laminates.

As used herein, the term "laminate" refers to any number of the same or different materials in layer form, each layer being secured to one another by any appropriate means such as by an inherent tendency of the materials to adhere to one another, or by inducing the materials to adhere as by a heating, radiative, chemical, or some other appropriate process. Some non-limiting process examples of forming laminates are (co)extrusion, thermal lamination, or adhesive bonding, or some combination thereof. The laminate may include an optional backing layer.

As used herein, the term "tie-layer" refers to a layer bonded to the ionomer layer(s). In most embodiments that include a backing layer, the backing layer is bonded to the ionomer layer(s) with the tie-layer. In some embodiments that include a substrate, the substrate is bonded to the ionomer layer(s) with the tie-layer. Each tie-layer may comprise multiple layers.

As used herein, "backing layer" refers to a tie-layer that forms the surface opposite from the ionomer surface of the multilayered laminate. In most embodiments, the backing layer requires a tie-layer of a different composition to bond it to the ionomer layer(s).

As used herein, "composite article" refers to an article formed from a multilayer laminate secured to a substrate.

As used herein, "substrate" refers to that part of the composite article that is behind the multilayered laminate, and typically provides the largest proportion of the mass of the composite article. It therefore governs the range of many of the physical properties of the composite article such as stiffness, tensile strength, impact strength, etc. Surface properties of the composite article, such as gloss, scratch resistance, abrasion resistance, color, appearance, "flop", are usually unaffected by the substrate.

As is well known in the art, the demarcation between "film" and "sheet" is nominally 250 µm. However, as used herein the term "sheet" can refer to single layered or multilayered structures with thicknesses that are greater than, equal to or less than 250 µm.

As used herein, the term "polymerization" includes homopolymerization, copolymerization, terpolymerization, and interpolymerization.

As used herein, the term "polymer" may be used to refer to homopolymers, copolymers, interpolymers, terpolymers, etc. Likewise, a copolymer may refer to a polymer comprising at least two monomers, optionally with other monomers. Polymer may also refer to one or more polymers regardless of the method, time, and apparatuses used to combine the polymers. Additionally, polymer may be used to refer to polymeric compositions.

When a polymer is referred to as comprising a monomer, the monomer is present in the polymer in the polymerized form of the monomer or in the derivative form the monomer. However, for ease of reference the phrase comprising the (respective) monomer or the like is used as shorthand.

As used herein, the term "elastomer," "rubber," or "elastomeric composition," refers to any polymer or composition of polymers consistent with the ASTM D1566 definition. The terms may be used interchangeably with the term "rubber(s)", as used herein.

In an embodiment, the composite article provides for a multilayered sheet secured to a substrate. The multilayered sheet provides for an ionomer layer (surface layer), pigmented or natural color, and a tie-layer, pigmented or natural color. The multilayered sheet is secured to a substrate.

In another embodiment, the composite article provides for a multilayered sheet including a backing layer. The multilayered sheet provides for an ionomer layer (surface layer), pigmented or natural color, a tie-layer, pigmented or natural color, and a backing layer.

In another embodiment, the composite article provides for a multilayered sheet secured to a substrate. The multilayered sheet provides for a set of ionomer layers comprising a surface layer of clear ionomer and a sub-surface layer of pigmented or clear ionomer, and a pigmented or natural color tie-layer. The multilayered sheet is secured to a substrate.

The composite article also provides for a multilayered sheet, including a backing layer, secured to a substrate. The multilayered sheet provides for a set of ionomer layers comprising a surface layer of clear ionomer and a sub-surface layer of pigmented or clear ionomer, a pigmented or natural color tie-layer, and a pigmented or natural color backing layer.

In yet another embodiment, the composite article provides for a multilayered sheet including a backing layer secured to a substrate. The multilayered sheet provides for an ionomer layer (surface layer), pigmented or natural color, a tie-layer, pigmented or natural color, and a pigmented or natural color backing layer. The multilayered sheet is secured to a substrate.

In an embodiment, the composite article provides for a multilayered sheet including a backing layer secured to a substrate. The multilayered sheet provides for a set of ionomer layers comprising a surface layer of clear ionomer and a sub-surface layer of pigmented or clear ionomer, a pigmented or natural color tie-layer, and a pigmented or natural color backing layer. The multilayered sheet is secured to a substrate.

In another embodiment, the composite article provides for a multilayered sheet secured to a substrate. The multilayered sheet provides for a set of ionomer layers comprising a surface layer of clear ionomer and a sub-surface layer of pigmented or clear ionomer, and a pigmented or natural color tie-layer. The multilayered sheet is secured to a substrate.

Ionomer

Ionomers useful in the present invention are ionic compounds which are copolymers of $C_2$ to $C_4$ α-olefin derived units (ethylene is herein included as an "α-olefin"), and $C_3$ to $C_6$ α,β-ethylenically unsaturated carboxylic acids, and which contain one or more kinds of metallic or organic cations associated with at least 5% of the acidic pendant groups of the polymer. Typical ionomers and methods of production are disclosed in, for example, U.S. Pat. Nos. 3,264,272, 4,911,451, 5,210,138, and 5,929,174; and WO 98/52981, 95/11929, 96/23009, 97/11995, and 97/02317, and described in COMPREHENSIVE POLYMER SCIENCE 755-772 (Colin Booth & Colin Price, ed. Pergamon Press 1989), in particular relating to ethylene-based materials.

The metal ion or ions suitable for forming the ionic copolymers of the present invention comprise mono, di or tri-valent metal ions in the Groups 1 through 13 of the Periodic Table of Elements. Embodiments include the following metal ions: $Na^+$, $K^+$, $Li^+$, $Cs^+$, $Ag^+$, $Hg^+$, $Cu^+$, $Be^{2+}$, $Mg^{2+}$, $Ca^{2+}$, $Sr^{2+}$, $Ba^{2+}$, $Cu^{2+}$, $Cd^{2+}$, $Hg^{2+}$, $Pb^{2+}$, $Fe^{2+}$, $Co^{2+}$, $Ni^{2+}$, $Zn^{2+}$, $Al^{2+}$ $Sc^{3+}$, $Fe^{3+}$, $Al^{3+}$ and $Yt^{3+}$. In the various ions mentioned above, $Mg^{2+}$, $Na^+$ and $Zn^{2+}$ are metals used in desirable embodiments. Reaction of the carboxylic acid groups of the ionomer and a metal ion derived from a desirable metal compound (metal oxide, metal chloride, etc.) is referred to as "neutralization".

The ionomers useful in the present invention, either alone or as a blend of two or more ionomers, generally include more than 60 wt % α-olefin derived units in one embodiment by weight of the ionomer, and more than 70 wt % α-olefin derived units in another embodiment, and more than 80 wt % α-olefin derived units in one embodiment, and more than 85 wt % α-olefin derived units in yet another embodiment, and less than 95 wt % α-olefin derived units in another embodiment, and less than 85 wt % α-olefin derived units in another embodiment, and less than 75 wt % α-olefin derived units in yet another embodiment, and from 60 to 95 wt % α-olefin derived units in another embodiment, wherein a desirable range of α-olefin derived units that make up the ionomer is any combination of any upper limit with any lower limit described herein; and from 5 to 25 wt % of α,β-ethylenically unsaturated carboxylic acid derived units in one embodiment, and from 1 to 15 wt % of α,β-ethylenically unsaturated carboxylic acid derived units in another embodiment, and from 8 to 20 wt % of α,β-ethylenically unsaturated carboxylic acid derived units in another embodiment, wherein a desirable embodiment of a useful ionomer may comprise any upper wt % limit and any lower wt % limit of any α,β-ethylenically unsaturated carboxylic acid derived units described herein.

The polymer may be neutralized to form the ionomer to any degree between 10% to 100% based on the total amount of neutralizable carboxylate groups in one embodiment, and from 20% to 80% in another embodiment, and from 40% to 75% in yet another embodiment, and from 5% to 70% in yet another embodiment, provided the necessary scratch and mar resistance is maintained. A desirable level of neutralization may include any upper neutralization % limit and any lower neutralization % limit described herein.

One embodiment of an ionomer can be described as in the following structure (1):

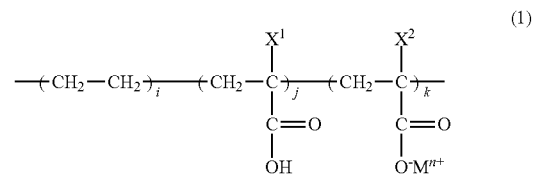

wherein $X^1$ and $X^2$ can be the same or different and are hydrogen or a $C_1$ to $C_6$ alkyl, and $M^{n+}$ is a metal ion or $NH_4^+$. Of course, it is understood that when n is >1, such as with a divalent metal ion such as $Zn^{2+}$, that charge neutrality for the ionomer is achieved by reaction with a total of n acid groups from either the same polymer chain, or an adjacent polymer chain. The structure (1) is not intended to be construed that the ionomer is a block copolymer or limited to being a block copolymer. The values of i, j, and k are determined by the following relationships (2) and (3):

$$\frac{j+k}{i+j+k} = Q \quad (2)$$

$$\frac{k}{j+k} = P \quad (3)$$

wherein Q is from 10 to 40% of the polymer units derived from the acidic monomer(s) relative to the total weight of the ionomer in one embodiment, and from 15 to 20% of polymer units derived from the acidic monomer(s) in another embodiment, and P is from 10 to 80% of the acidic groups neutralized with the metallic ions in one embodiment, and from 20 to 70% of the acidic groups neutralized with the metallic ions in another embodiment, and from 20 to 60% in yet another embodiment, and further ranges as stated above. The polymer component i, derived from ethylene in one embodiment, can be linear or branched.

The ionomers or blends of two or more ionomers should be capable of being formed into a sheet having a thickness of from 15 μm to 6 mm, and from 25 μm to 700 μm in another embodiment, and possess desired properties, i.e., a high or low gloss, scratch resistance, abrasion resistance, etc. Useful ionomers or ionomer blends have a peak melt temperature of greater than 75° C. in one embodiment, and between 75° C. and 100° C. in another embodiment, and between 75° C. and 95° C. in one embodiment, and between 80° C. and 90° C. in another embodiment; and a melt index (MI) of between 0.1 dg/min and 30 dg/min (ASTM D1238, 190/2.16) in one embodiment, from 0.2 to 8 dg/min in one embodiment, from 0.5 to 5 dg/min in another embodiment, and from 0.8 to 2.5 dg/min in yet another embodiment, wherein a desirable range may be any combination of any upper MI limit with any lower MI limit described herein.

The ionomers useful in the present invention should provide high scratch and impact resistance to the laminate and composite article. The ionomers or ionomer blends have a 1% secant flexural modulus (ASTM D-790) of greater than 50 MPa in one embodiment, and greater than 100 MPa in another embodiment, and greater than 200 MPa in another embodiment, and greater than 400 MPa in yet another embodiment, between 50 and 400 MPa in one embodiment, and from 100 to 350 MPa in another embodiment. Desirable ionomers are ethylene methacrylic acid copolymer ionomers and ethylene acrylic acid copolymers ionomers and the like. Particularly desirable ionomers are those that are sodium or zinc salts of acrylic acid or methacrylic acid copolymers.

Further, in a desirable embodiment, certain blends of ionomers based on ethylene acrylic acid copolymer neutralized with divalent and monovalent metal ions (cations) such as $Zn^{2+}$ and $Na^+$, display a synergistic MI "uplift" as disclosed in, for example, U.S. Pat. Nos. 5,210,138, and 5,929,174 are useful. In one embodiment of the invention, one or more of the ionomer layers that make up the laminate is a blend of a first ionomer having an MI value of from 0.6 to 1.0 dg/min, and a second ionomer having an MI value of from 2.1 to 3.0 dg/min. The blend of the first and second ionomers includes from 45 wt % to 95 wt % of the first ionomer in one embodiment, and from 55 wt % to 85 wt % of the first ionomer in another embodiment, and from 65 wt % to 80 wt % of the first ionomer in yet another embodiment, and from 72 wt % to 78 wt % of the first ionomer in yet another embodiment, and 75 wt % of the first ionomer in yet another embodiment, wherein a desirable range may include any upper wt % limit and any lower wt % limit described herein. The blends may include blends of two or more ionomers having different metallation (different metals and/or different % of metallation), different MI values, or a combination of variables.

Other examples of ionomers useful in the present invention include, but are not limited to, butadiene-acrylic acid copolymer ionomers, perfluorsulfonate ionomers, perfluorocarboxylate ionomers, telechelic polybutadiene ionomers, sulfonated ethylene-propylene-diene terpolymer ionomers, styrene-acrylic acid copolymer ionomers, sulfonated polystyrene ionomers, sulfonated polypentenamer ionomers, telechelic polyisobutylene sulfonated ionomers, alkyl methacrylate-sulfonate copolymer ionomers, styrene-based polyampholytes ionomers and acid-amine ionomers and the like. Typical examples of ionomers employing salts of carboxylic acid type pendent groups are disclosed in GB 1,011,981; U.S. Pat. Nos. 3,264,272; 3,322,734; 3,338,734; 3,355,319; 3,522,222; and 3,522,223. Typical examples of ionomers employing phosphonate-type pendent groups include those disclosed in U.S. Pat. Nos. 3,094,144; 2,764,563, 3,097,194; and 3,255,130. Typical examples of ionomers employing sulfonate-type pendent groups include those disclosed in U.S. Pat. Nos. 2,714,605; 3,072,618; and 3,205,285. Other useful ionomers are disclosed generally in U.S. Pat. Nos. 5,631,328, 5,631,328, 5,554,698, 4,801,649, 5,320,905, 5,973,046, and 4,569,865.

Ionomers comprising copolymers of ethylene derived units and acrylic acid (AA) derived units are desirable. Examples of commercially available ionomers include, but are not limited to, IOTEK ionomers (ExxonMobil Chemical Company, Houston, Tex.), such as IOTEK 8000, a 45% sodium neutralized ethylene-based ionomer of 15 wt % acrylic acid (prior to neutralization), and IOTEK 7030, a 25% zinc neutralized ethylene-based ionomer of 15 wt % acrylic acid, and SURLYN ionomers (DuPont Company, Wilmington, Del.).

The one or more ionomer layers may contain additives such as antioxidants, pigments or dyes, and other agents. In one embodiment, at least one layer of ionomer in the final composite article will have a pigment, antioxidant, or other additives. For external uses, it is desirable to add a UV stabilizer such as TINUVEN 791 (CIBA Specialty Chemicals) or UVASIL 2000 HM or LM (Great Lakes Chemicals), both silicon based compositions. Also, for scratch resistance, it is advantageous to add siloxane based compositions such as MB50-001 and/or MB50-321 (Dow Corning Corporation). Effective levels are known in the art and depend on the details of the base polymers, the fabrication mode and the requirements of the end application. In addition, hydrogenated and/or petroleum hydrocarbon resins and other plasticizers may be used as modifiers.

Other examples of additives include one or more of the following: heat stabilizers or antioxidants, neutralizers, slip agents, antiblock agents, pigments, antifogging agents, antistatic agents, clarifiers, nucleating agents, ultraviolet absorbers or light stabilizers, fillers, rosins or rosin esters, waxes, additional plasticizers and other additives in conventional amounts. In one embodiment, a metallic or metal flake pigment such as is used in the automotive industry may be used. The pigment may be included in a first, second, third ionomer layer, or any other layer. For example, the pigment may desirably be in a second layer only, the first layer having no pigment and providing gloss and scratch resistance to the laminate. This second layer may have metallic pigment or metal flake blend and be processed in a manner such that the final product has a shiny, metallic look, and changes appearance dependent upon the angle of view ("flop") useful in, for example, exterior automotive components, or a dull look useful in, for example, interior automotive components.

Tie-Layer

In one embodiment, the tie-layer is made from a (co)extrudable tie resin (CTR). In another embodiment, the tie-layer may comprise one or more layers of CTRs. In another embodiment, suitable CTRs include blends of CTRs (as described below) and/or blends of at least one CTR with conventional materials known in the art, i.e., acid polymers, soft ionomers, and thermoplastics, etc. (See WO 02/078953 and WO 02/078954).

In some of the structural formulas below, some of the bonds are shown attached to only one atom instead of two. This indicates that the moiety shown is a small segment of the whole polymer and that the free ends of those bonds are actually attached to other components of the polymer. For simplicity, only the structure of the moiety being discussed in the text is shown. One skilled in the art will understand this shorthand notation, the types of "other components" to which the subject moiety would be attached for the particular polymer composition and the fact that the subject moiety might be present in many places in the polymer.

Suitable CTRs include amine-containing polymers. Amine-containing polymers are copolymers of one or more $C_2$-$C_{10}$ α-olefins, preferably ethylene and/or propylene, and one or more ethylenically copolymerizable amine-containing monomer, the copolymer having amine groups that may be represented by the general formula:

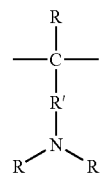

where each R is independently H or a $C_1$ to $C_{10}$ hydrocarbon and R' is a bond or a $C_1$ to $C_{10}$ hydrocarbon.

In a preferred embodiment, R is H and R' is a bond.

Other suitable CTRs include epoxy-containing copolymers and terpolymers. Epoxy-containing copolymers and terpolymers may be produced by direct copolymerization of $C_2$-$C_{10}$ α-olefins, preferably ethylene and/or propylene, and epoxy-containing monomers such as glycidyl acrylate or glycidyl methacrylate, and for terpolymers, with other ester monomers. Epoxy-containing monomers may be represented by the general formula:

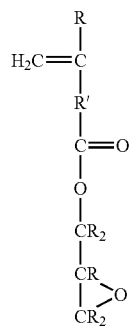

where each R is independently H or a $C_1$ to $C_{10}$ hydrocarbon and R' is independently a bond or a $C_1$ to $C_{10}$ hydrocarbon. The polymers of this invention may be made using mixtures of monomers with different R and R' groups.

Alternatively, epoxy-containing polymers may be made with an ester monomer to form an epoxy-containing terpolymer. The ester monomer may be represented by the general formula:

$$H_2C=\underset{\underset{\underset{OR''}{|}}{\underset{C=O}{|}}}{\overset{\overset{R}{|}}{\underset{R'}{C}}}$$

where each R is independently H or a $C_1$ to $C_{10}$ hydrocarbon; each R' is independently a bond or a $C_1$ to $C_{10}$ hydrocarbon; and R'' is a $C_1$ to $C_{10}$ hydrocarbon. The polymers of this invention may be made using mixtures of monomers with different R, R' and R'' groups.

Preferred embodiments of epoxy-containing polymers include the copolymers of ethylene and/or propylene with one or more ester monomers methyl(meth)acrylate, ethyl (meth)acrylate, propyl(meth)acrylate, or butyl(meth)acrylate.

Epoxy-containing polymers may also be produced by grafting epoxy-containing monomers onto $C_2$-$C_{10}$ α-olefins polymers, preferably ethylene and/or propylene polymers and/or copolymers of $C_2$-$C_{10}$ α-olefins with polar monomers such as vinyl esters and other ester monomers. These grafted, epoxy-containing polymers may be represented by the general formula:

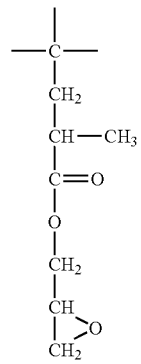

In some embodiments, each polymer molecule can be grafted with an epoxy-containing monomer, such as glycidyl methacrylate, in several places along the polymer chain.

Preferable embodiments include glycidyl methacrylate grafted onto polyethylene or a copolymer of ethylene with one or more ester monomers methyl(meth)acrylate, ethyl (meth)acrylate, propyl(meth)acrylate, or butyl(meth)acrylate.

Suitable CTRs also include acidic copolymers. Acidic copolymers include bipolymers of $C_2$-$C_{10}$ α-olefins, preferably ethylene and/or propylene, and acidic monomers that may be represented by the general formula:

$$H_2C=\underset{\underset{\underset{OH}{|}}{\underset{C=O}{|}}}{\overset{\overset{R}{|}}{\underset{R'}{C}}}$$

where R is H or a $C_1$ to $C_{10}$ hydrocarbon and R' is a bond or a $C_1$ to $C_{10}$ hydrocarbon.

In some embodiments, the polymers of this invention may be made using mixtures of acid monomers with different R and R' substituents. Preferred embodiments are ethylene and/or propylene copolymerized with acrylic acid and/or methacrylic acid.

Suitable CTRs may also be bipolymers of $C_2$-$C_{10}$ α-olefins, preferably ethylene and/or propylene, and ethylenically copolymerizable ester monomers represented by the general formula:

$$H_2C=\underset{\underset{\underset{OR''}{|}}{\underset{C=O}{|}}}{\overset{\overset{R}{|}}{\underset{R'}{C}}}$$

where R is H or a $C_1$ to $C_{10}$ hydrocarbon; R' is a bond or a $C_1$ to $C_{10}$ hydrocarbon; and R'' is a $C_1$ to $C_{10}$ hydrocarbon.

The polymers of this invention may be made using mixtures of ester monomers with different R, R' and R'' groups. Preferred embodiments are ethylene and/or propylene copolymerized with one or more of ester monomers methyl(meth) acrylate, ethyl(meth)acrylate, propyl(meth)acrylate, or butyl (meth)acrylate.

Suitable CTRs include copolymers of $C_2$-$C_{10}$ α-olefins, preferably ethylene and/or propylene, and vinyl ester monomers represented by the formula:

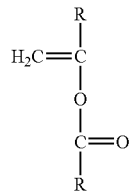

where each R is independently H or a $C_1$ to $C_{10}$ hydrocarbon.

Alternatively, vinyl ester copolymers may be made with other ester monomers to form terpolymers. The other ester monomer may be represented by the general formula:

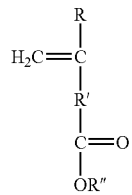

where R is H or a $C_1$ to $C_{10}$ hydrocarbon; R' is a bond or a $C_1$ to $C_{10}$ hydrocarbon; and R" is a $C_1$ to $C_{10}$ hydrocarbon.

The polymers of this invention may be made using mixtures of vinyl ester monomers and other ester monomers with different R, R' and R" groups. Preferred embodiments include ethylene or propylene copolymerized with vinyl acetate optionally with butyl(meth)acrylate.

Suitable CTRs also include grafted polymers of $C_2$-$C_{10}$ α-olefins, preferably ethylene and/or propylene, (such as LDPE, LLDPE, HDPE, PP, PP copolymers, EPR or EPDM), ethylene vinyl ester copolymers (based on from $C_1$ to $C_{10}$ acids), ethylene (meth)acrylate ester copolymers (made from $C_1$ to $C_{10}$ alcohols) grafted with (meth)acrylic acid represented by the general formula:

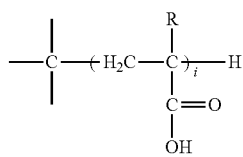

where each R is independently H or a $C_1$ to $C_{10}$ hydrocarbon and i is from 1 to 5. Each polymer molecule can be grafted with methacrylic acid in several places along the polymer chain.

Suitable CTRs also include polymers made with unsaturated diacids, anhydrides of unsaturated diacids, or monoesters of unsaturated diacids. Suitable unsaturated diacids include, but are not limited to, maleic acid, itaconic acid, citraconic acid and 2-pentenedioic acid and their corresponding anhydrides and monoesters. Illustrative examples may be represented by the general formulas:

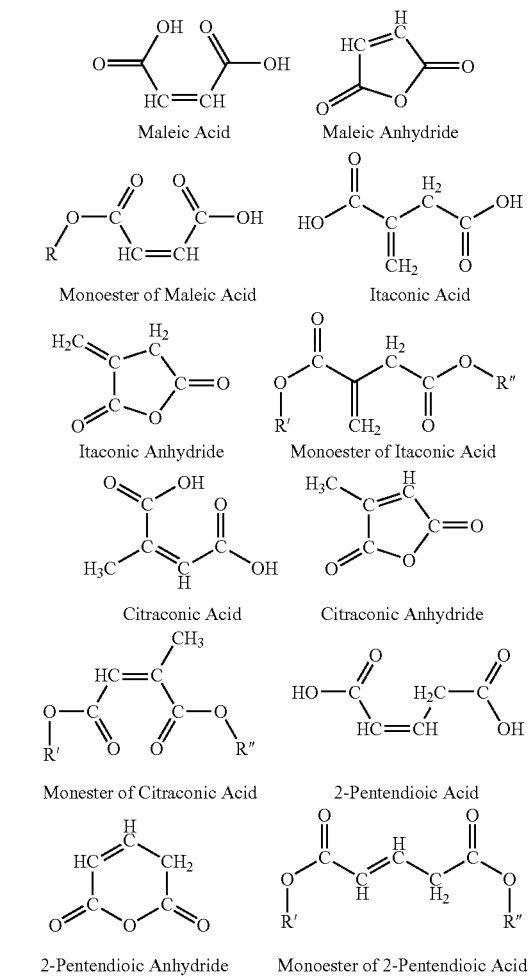

wherein for the monoester of maleic acid R is a $C_1$ to $C_{10}$ hydrocarbon and wherein for the monoesters of itaconic acid, citraconic acid and 2-pentenedioic acid, either R' is H and R" is a $C_1$ to $C_{10}$ hydrocarbon or R' is a $C_1$ to $C_{10}$ hydrocarbon and R" is H.

Other suitable CTRs include copolymers of one or more $C_2$ to $C_{10}$ α-olefins and carbon monoxide. These copolymers may be optionally copolymerized with one or more ethylenically copolymerizable acidic or ester monomers.

Ethylenically copolymerizable acidic monomers may be represented by the general formula:

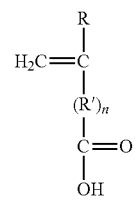

wherein R is H or a $C_1$ to $C_{10}$ hydrocarbon; R' is a $C_1$ to $C_{10}$ hydrocarbon; and n is 0 or 1. Preferred embodiments include acrylic acid and (meth)acrylic acid.

Ethylenically copolymerizable ester monomers of may be represented by the following general formula:

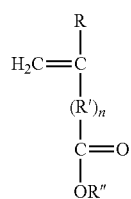

wherein R is H or a $C_1$ to $C_{10}$ hydrocarbon; R' is a $C_1$ to $C_{10}$ hydrocarbon; R" is a $C_1$ to $C_{10}$ hydrocarbon; and n is 0 or 1. Preferred embodiments include the group consisting of methyl(meth)acrylate, ethyl(meth)acrylate, propyl(meth)acrylate, and butyl(meth)acrylate.

Ethylenically copolymerizable vinyl ester monomers may be represented by the following general formula:

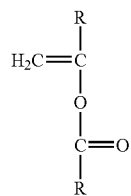

wherein each R is independently H or a $C_1$ to $C_{10}$ hydrocarbon. A preferred embodiment includes vinyl acetate.

In a preferred embodiment, the CTR is selected from the group consisting of an amine-containing polymer, an epoxy-containing polymer, a carbon monoxide containing polymer, a polar copolymer, a polymer made from an unsaturated diacid, a polymer made from a monoester of an unsaturated diacid, a polymer made from an anhydride of an unsaturated diacid, and a polyolefin grafted with acrylic acid.

In another preferred embodiment, the CTR is selected from the group consisting of an amine-containing polymer, an epoxy-containing polymer, a carbon monoxide containing polymer, an ester polymer, a vinyl ester polymer, a polymer made from an unsaturated diacid, a polymer made from a monoester of an unsaturated diacid, a polymer made from an anhydride of an unsaturated diacid, and a polyolefin grafted with acrylic acid.

CTRs useful in the invention have a melt index (MI ASTM D1238, 190/2.16) of from 0.1 to 60 dg/min in one embodiment, from 0.5 to 30 dg/min in another embodiment, from 1 to 20 dg/min in yet another embodiment, and from 2.0 to 10 dg/min in yet another embodiment, a desirable range including a combination of any upper MI limit and any lower MI limit disclosed herein.

In one embodiment, the backing layer is a blend of an appropriate CTR (selected independently from the CTR used in the tie-layer) and the material being used as the substrate material in the finished composite article. One skilled in the art will appreciate the need to select materials based upon processing parameters, i.e. selecting low melt flow rates for extruding backing layers and higher melt flow rates for substrates that are injection molded and other parameters important for creating a useful blend. General principles for making useful polymer-polymer blends can be found in the academic literature including books such as *Polymer Blends and Composite Articles*, John A. Manson and Leslie H. Sperling, Plenum Press, New York, 1976, Polymer Blends, edited by D. R. Paul and Seymour Newman, Academic Press, New York, 1978, *Specific Interactions and the Miscibility of Polymer Blends: Practical Guides for Predicting & Designing Miscible Polymer Mixtures*, Michael M. Coleman, John F. Graf, and Paul C. Painter, Technomic Publication Company, 1991, *Polymeric Compatibilizers: Uses and Benefits in Polymer Blends*, Sudhin Datta and David J. Lohse, Hanser/Gardner Publications, New York, 1996, *Polymer Blends*, edited by D. R. Paul and C. B. Bucknall, John Wiley & Sons, New York, 2000, and *Polymer Blends Handbook*, edited by L. A. Utracki, Kluwer Academic Press, Boston, 2003. The blend may include from 10 wt % to 90 wt % of a CTR in the backing layer in one embodiment, and from 20 wt % to 80 wt % in another embodiment, and from 25 wt % to 65 wt % in yet another embodiment, and from 30 wt % to 50 wt % in yet another embodiment, based upon the total weight of the blend. In another embodiment, the blend comprises at least 10 wt % of a CTR, alternatively at least 15 wt %, alternatively at least 20 wt %, and alternatively at least 25 wt %, based upon the total weight of the blend. Desirable embodiments of the backing layer include any combination of any upper CTR wt % limit and any lower CTR wt % limit described herein.

The substrate materials used to blend with the at least one tie-layer material has a 1% secant flexural modulus (ASTM D-790) of greater than 100 MPa in one embodiment, greater than 200 MPa in another embodiment, greater than 300 MPa in yet another embodiment, and greater than 500 MPa in yet another embodiment, and greater than 900 MPa in yet another embodiment, and less than 1000 MPa in yet another embodiment.

The tie-layer may have a thickness in the range of from 2.5 µm to 6 mm in one embodiment, and from 25 µm to 650 µm in another embodiment, from 2.5 µm to 400 µm in yet another embodiment, from 2 µm to 100 µm in yet another embodiment, and from 10 µm to 1 mm in yet another embodiment. Desirable ranges may include any combination of any upper tie-layer thickness limit and any lower tie-layer thickness limit described herein.

The tie-layer may also include additives as described above for the ionomer layers, such as pigments, dyes, antioxidants, antiozonants, and other agents to improve its performance. Examples include one or more of the following: heat stabilizers or antioxidants, neutralizers, slip agents, antiblock agents, pigments, antifogging agents, antistatic agents, clarifiers, nucleating agents, ultraviolet absorbers or light stabilizers, fillers, rosins or rosin esters, waxes, additional plasticizers and other additives in conventional amounts.

Backing Layer

As stated above, a "backing layer" refers to a tie layer, on the opposite side of the surface ionomer layer of the multilayered laminate. In an embodiment that includes a substrate, the backing layer secures the multilayer laminate to the substrate. In another embodiment, the backing layer material comprises a blend of tie-layer material(s), as described above, with substrate material(s) described below and/or substrate material(s) disclosed in WO 02/078953 A. However, in yet another embodiment, the backing layer comprises at least one substrate material described below.

When the backing layer comprises a blend, the blend may include from 10 wt % to 90 wt % of tie-layer material(s) by weight of the backing layer blend in one embodiment, and from 20 wt % to 80 wt % in another embodiment, and from 25 wt % to 65 wt % in yet another embodiment, and from 40 wt % to 60 wt % in yet another embodiment, a desirable embodiment of the backing layer including any combination of any upper limit and any lower limit of tie-layer materials described herein.

Substrate

A substrate material is a material, as described below, securable by any means known in the art, to the laminate. The substrate is contacted with and secured to the tie-layer to form a composite article. Substrate materials may be selected from the group comprising acrylonitrile-ethylene-styrene (AES); acrylonitrile-styrene-acrylate (ASA); amorphous polyamides (made from mixed diacids, mixed diamines, or both); isobutylene-based elastomers including butyl rubbers based on isobutylene with isoprene and other monomers, and copolymers of isobutylene with alkylstyrene and other monomers, including the halogenated versions of the aforementioned elastomers; chlorosulfonated polyethylene rubbers (Hypalon™ from DuPont, Wilmington, Del.); copolyester (PETG: cyclohexane dimethanol copolyester, and other chemistries); cyclic olefin copolymer (COC); dynamically vulcanized alloys (Santoprene™ and Geoplast™ from Advanced Elastomer Systems, Akron, Ohio, Keltalloy™ from Alliance Alloys, Leominster, Mass., NexPrene™ from Harvest Polymers, Farnham, United Kingdom and similar products); liquid crystal polymers (LCP); natural rubber; general purposes rubbers; nitrile rubber; polyacrylonitrile (PAN); polyamides compounds that are impact modified with acid and/or anhydride containing polymers or rubbers; polyamide elastomers (Pebax™ from Atofina, Philadelphia, Pa., Vestamid™ from Degussa, Parsippany, N.J.; polyarylate (amorphous, aromatic polyester); polyaryletherketone (PAEK); polybenzimidazole; polybutylene terephthalate (PBT); polybutylene naphthalate (PBN); polyester elastomers (such as Hytrel™ from DuPont, Riteflex™ from Ticona, Summit, N.J., Keyflex® BT from Harvest Polymers, Farnham, United Kingdom and similar products); polyethylene naphthalate (PEN); polyetherketone (PEK); polyethersulfone (PES); polyimidesulfone (PIS); polymethacrylate acrylonitrile butadiene styrene (MABS); polyphenylsulfone; polymethylmethacrylate (PMMA); polystyrene; high impact polystyrene (HIPS); syndiotactic polystyrene; polystyrene maleic anhydride (SMA); polyethylene-vinyl alcohol (EVOH); sheet molding compounding (SMC) or a crosslinked, glass-reinforced, polyester/polystyrene composition; bulk molding compound (BMC); crosslinked polyurethane (RIM); reinforced polyurethane (RRIM), crosslinked dicyclopentadiene (Metton® RIM, Metton America, Inc, LaPorte, Tex.; silicone rubber; styrene block copolymers (SIS, SEBS); compression-molded articles of woven, glass-fiber-reinforced polypropylene fibers; or combinations thereof where appropriate.

In another embodiment, the substrate material may comprise acrylonitrile-ethylene-styrene (AES), acrylonitrile-styrene-acrylate (ASA), polymethacrylate acrylonitrile butadiene styrene (MABS), polyacrylonitrile (PAN), polymethylmethacrylate (P polyaryletherketone (PAEK), polybenzimidazole, polyetherketone (PEK), polyethersulfone (PES), polyimidesulfone (PIS), polyphenylsulfone (Radel™, Solvay), amorphous polyamides (made from mixed diacids, mixed diamines, or both), polyamides compounds that are impact modified with acid and/or anhydride containing polymers or rubbers, polyamide elastomers (Pebax™ from Atofina, Philadelphia, Pa., Vestamid™ from Degussa, Parsippany, N.J.), liquid crystal polymers (LCP), polyarylate (amorphous, aromatic polyester), polybutylene naphthalate (PBN), polybutylene terephthalate (PBT), polyethylene naphthalate (PEN), polyester elastomers (such as Hytrel™ from DuPont, Riteflex™ from Ticona, Summit, N.J., Keyflex® BT from Harvest Polymers, Farnham, United Kingdom and similar products), copolyester (PETG: cyclohexane dimethanol copolyester, and other chemistries), crosslinked polyurethane (RIM), reinforced polyurethane (RRIM), natural rubber, general purposes rubbers, isobutylene-based elastomers including butyl rubbers based on isobutylene with isoprene and other monomers, and copolymers of isobutylene with alkylstyrene and other monomers, including the halogenated versions of the aforementioned elastomers, chlorosulfonated polyethylene rubbers (Hypalon™ from DuPont, Wilmington, Del.), dynamically vulcanized alloys (Santoprene™ and Geoplast™ from Advanced Elastomer Systems, Akron, Ohio, Keltalloy™ from Alliance Alloys, Leominster, Mass., NexPrene™ from Harvest Polymers, Farnham, United Kingdom and similar products), nitrile rubber, styrene block copolymers (SIS, SEBS), silicone rubber, polystyrene, syndiotactic polystyrene, high impact polystyrene (HIPS), polystyrene maleic anhydride (SMA), bulk molding compound (BMC), sheet molding compounding (SMC) or a crosslinked, glass-reinforced, polyester/polystyrene composition, cyclic olefin copolymer (COC), crosslinked dicyclopentadiene (Metton® RIM, Metton America, Inc, LaPorte, Tex., polyethylene-vinyl alcohol (EVOH); or combinations thereof where appropriate.

The substrate materials described above may be used in foam form in some embodiments of the invention.

In one embodiment, the substrate materials may comprise mixtures of the substrate materials described above and/or mixtures with substrate materials disclosed in WO 02/067853 A1.

The substrate materials may also be combined with reinforcing and/or non-reinforcing materials such as glass fibers, carbon fibers, carbon black, polyaramide fibers, polyester fibers, mineral fibers, mica, talc, silica, metal whiskers, nanoclay, and the like. In a preferred embodiment, the fillers may be combined, for example in a blend, with a substrate material by any suitable means known in the art to produce a filled blend.

Embodiments of the substrate material of the invention may contain additives. Additives may be included in the substrate formulations or any other ionomer layer or tie-layer disclosed herein, as suggested by the intended uses of the materials and the knowledge and experience of the formulator. In one embodiment, included in any layer is a primary antioxidant to deter oxidative degradation of the polymer and/or an acid scavenger to neutralized acid catalyst residues which may be present in the polymer to a greater or lesser extent. Examples of the former class of additives would be hindered phenolic antioxidants and hindered amine light stabilizers, examples and the application of which are well documented in the art. Examples of the latter category of additives would be metal salts of weak fatty acids such as sodium, calcium, or zinc stearate and weakly basic, naturally occurring minerals such as hydrotalcite or a synthetic equivalent like DHT-4A ($Mg_{4.5}Al_2(OH)_{13}CO_{3-3.5}H_2O$, Kyowa Chemical Industry Co., Ltd., Kagawa, Japan).

Many other types of additives could be optionally included in the layer formulations of this invention such as flame retardants, lubricants, antistatic agents, slip agents, antiblocking agents, colorants, metal deactivators, mold release agents, fillers and reinforcements, fluorescent whitening agents, biostabilizers, and others.

Laminate Formation

The laminate may be formed by techniques well-known and practiced in the art. Illustrative examples of laminate formation processes include coextrusion, thermal lamination, adhesive lamination, extrusion lamination and compression molding.

In one embodiment, the ionomer layer is adhered to the tie-layer in a coextrusion process. The coextrusion process can include 2, 3, 4 or more coextruded layers. In general, the process includes first melting each material in an appropriate device and extruding these molten or semi-molten materials together through a die or dies.

In one embodiment, extruders are used with a die that provides thermal isolation and/or control of each of the materials being processed to form the multilayer laminate. The temperature control can be achieved by any suitable means such as insulation and/or cooling and/or heating elements that can be controlled by electricity, steam, oil, or other gases or liquids. Such a coextrusion apparatus is described in, for example, U.S. Pat. Nos. 5,516,474 and 5,120,484, and references cited therein. The extruder/die may have separate extrusion layers within the die, and having a means by which to heat the material to a temperature higher than the melt temperature going into the die. For example, the die may be controlled at a temperature from about 150° C. to 250° C., while one or more of the material streams that will make up the laminate may be further heated to from 230° C. to 300° C. Heating the layer having the pigment in this manner is particularly desirable. This procedure improves the "flop" of the laminate, in particular when metallic pigments are used such as, for example, in an exterior automotive part.

Further, in some embodiments, the cooling of the laminate takes place on a chill roll or rolls, and may be cooled any number of ways. In one embodiment, the cooling takes place at a chill roll temperature of from 25° C. to 90° C. In yet another embodiment, the chill rolls are at from 4° C. to 20° C. yielding a dull finish in the composite article when using a metallic pigment.

For more processing information, one skilled in the art will know to consult the supplier or resources available from a technical library. The various layers can be combined in the melt stage via appropriate mechanisms known in the art prior to exiting the die, or combined after exiting the die. This is followed by contacting the thus formed multi-layered laminate with a series of chill rolls and sheet conveyer. The cooled laminate is then cut to size or rolled by appropriate means. Alternatively, one skilled in the art will appreciate that the various materials can be extruded or calendered singly and combined into a multilayer structure in a separate process.

In one embodiment, the extrusion process conditions are as follows. The temperature controllers of the extruder(s) used to process the ionomer(s) are set at 180° C. to 250° C. in one embodiment, yielding a final material melt temperature of 200° C. to 225° C. or higher. Desirably, the ionomer material melt temperature is greater than 200° C. in another embodiment. The temperature controllers of the extruder(s) used to process the tie-layer(s) are set for 195° C. to 225° C. in another embodiment, yielding a final material melt temperature of 210° C. to 230° C. The viscosity of each material being extruded should be closely matched to each other, at their respective processing temperatures, to achieve the targeted visual properties such as gloss level and "flop" if needed, and interlayer bonding.

In one embodiment, the backing layer comprises an extrudable acrylic polymer such as acrylonitrile-ethylene-styrene (AES), acrylonitrile-styrene-acrylate (ASA), polymethacrylate acrylonitrile butadiene styrene (MABS), polymethylmethacrylate (PMMA). In order to avoid bubble formation during melt processing, these polymers may need to be dried prior to being extruded. Typical drying conditions are 2 to 8 hours at 60° C. to 100° C. in a recirculating air dryer with some provision for removing the moisture from the recirculating air. The moisture can be removed from the recirculating air using desiccant beds or mechanical refrigeration units or other appropriate means. Alternatively, vacuum dryers operating in similar temperature ranges can be used. In one embodiment, for example, the acrylic polymer is extruded at melt temperatures in the range of 150° C. to 200° C. In another embodiment, the melt temperature is between 240° C. and 280° C. In another embodiment, the melt temperature is between 180° C. and 225° C.

In another embodiment, the backing layer comprises an extrudable engineering thermoplastic polymer such as polyaryletherketone (PAEK), polybenzimidazole, polyetherketone (PEK), polyethersulfone (PES), polyimidesulfone (PIS), or polyphenylsulfone (Radel™, Solvay). In order to avoid bubble formation during melt processing, these polymers will usually need to be dried prior to being extruded. Typical drying conditions are 4 to 12 hours at 100° C. to 150° C. in a recirculating air dryer with some provision for removing the moisture from the recirculating air. The moisture can be removed from the recirculating air using desiccant beds or mechanical refrigeration units or other appropriate means. Alternatively, vacuum dryers operating in similar temperature ranges can be used. In one embodiment, the engineering thermoplastic polymer is extruded at melt temperatures in the range of 200° C. to 400° C. In another embodiment, the melt temperature is between 250° C. and 325° C. In another embodiment, the melt temperature is between 340° C. and 380° C. In another embodiment, the melt temperature is between 350° C. and 400° C. With these materials, it is useful to keep the melt temperature from getting lower than target because the viscosity will become too high causing problems in coextrusion, especially with layer thickness uniformity in the transverse and also machine directions, and interlayer bonding will be adversely affected.

In yet another embodiment, the backing layer comprises an extrudable polyamide such as amorphous polyamide (made from mixed diacids, mixed diamines, or both), a polyamide compound that is impact modified with acid and/or anhydride containing polymers or rubbers, or polyamide elastomer (Pebax™ from Atofina, Philadelphia, Pa., Vestamid™ from Degussa, Parsippany, N.J.). In order to avoid hydrolytic degradation and possibly bubble formation during melt processing, these polymers will usually need to be dried prior to being extruded. Typical drying conditions are 4 to 12 hours at 80° C. to 140° C. in a recirculating air dryer with some provision for removing the moisture from the recirculating air. The moisture can be removed from the recirculating air using desiccant beds or mechanical refrigeration units or other appropriate means. Alternatively, vacuum dryers operating in similar temperature ranges can be used. In one embodiment, the polyamide is extruded at melt temperatures in the range of 200° C. to 300° C. In another embodiment, the melt temperature is between 250° C. and 325° C.

In one embodiment, the backing layer comprises an extrudable polyesters such as liquid crystal polymers (LCP), polyarylate (amorphous, aromatic polyester), polybutylene naphthalate (PBN), polybutylene terephthalate (PBT), polyethylene naphthalate (PEN), polyester elastomers (such as Hytrel™ from DuPont, Riteflex™ from Ticona, Summit, N.J., Keyflex® BT from Harvest Polymers, Farnham, United Kingdom and similar products), or copolyester (PETG: cyclohexane dimethanol copolyester, and other chemistries). In order to avoid hydrolytic degradation and possibly bubble formation during melt processing, these polymers will usually need to be dried prior to being extruded. Typical drying conditions are 4 to 12 hours at 80° C. to 150° C. in a recirculating air dryer with some provision for removing the moisture from the recirculating air. The moisture can be removed from the recirculating air using desiccant beds or mechanical refrigeration units or other appropriate means. Alternatively, vacuum dryers operating in similar temperature ranges can be used. In one embodiment, the polyester is extruded at melt temperatures in the range of 190° C. to 400° C. In another embodiment, the melt temperature is between 330° C. and 400° C. In another embodiment, the melt temperature is between 260° C. and 300° C. In another embodiment, the melt temperature is between 250° C. and 290° C. In another embodiment, the melt temperature is between 190° C. and 240° C.

In another embodiment, the backing layer comprises an extrudable thermoplastic elastomer such as a dynamically vulcanized alloy or a styrene block copolymer. In one embodiment, the thermoplastic alloy is extruded at melt temperatures in the range of 150° C. to 250° C. In another embodiment, the melt temperature is between 200° C. and 250° C. In another embodiment, the melt temperature is between 180° C. and 225° C.

In yet another embodiment, the backing layer comprises an extrudable styrenic polymer such as polystyrene, syndiotactic polystyrene, high impact polystyrene (HIPS), or polystyrene maleic anhydride (SMA). In one embodiment, the styrenic polymer is extruded at melt temperatures in the range of 150° C. to 300° C. In another embodiment, the melt temperature is between 200° C. and 250° C. In another embodiment, the melt temperature is between 180° C. and 225° C.

In one embodiment, the backing layer comprises cyclic olefin copolymer (COC). In one embodiment, the cyclic olefin copolymer is extruded at melt temperatures in the range of 150° C. to 300° C. In another embodiment, the melt temperature is between 200° C. and 250° C.

In another embodiment, the backing layer comprises polyethylene-vinyl alcohol (EVOH). In one embodiment, the ethylene vinyl alcohol polymer is extruded at melt temperatures in the range of 150° C. to 250° C. In another embodiment, the melt temperature is between 200° C. and 250° C. In another embodiment, the melt temperature is between 180° C. and 225° C.

The aforementioned examples are provided for illustration and one skilled in the art will appreciate the numerous variations possible using such methods and techniques well-known in the art. In no way are they intended to limit the scope of the claimed invention unless affirmatively recited in the claims.

As recognized by an artisan, other laminate formation processes are useful with the materials disclosed herein as all the materials described herein for the tie-layer, backing layer, and substrate do not readily lend themselves to a (co)extrusion processes as described above.

Examples of such materials include polyacrylonitrile (PAN); crosslinked polyurethane (RIM); reinforced polyurethane (RRIM); natural rubber; general purposes rubbers; isobutylene-based elastomers including butyl rubbers based on isobutylene with isoprene and other monomers; and copolymers of isobutylene with alkylstyrene and other monomers; including the halogenated versions of the aforementioned elastomers; chlorosulfonated polyethylene rubbers (Hypalon™ from DuPont, Wilmington, Del.), dynamically vulcanized alloys (Santoprene™ and Geoplast™ from Advanced Elastomer Systems, Akron, Ohio, Keltalloy™ from Alliance Alloys, Leominster, Mass., NexPrene™ from Harvest Polymers, Farnham, United Kingdom and similar products); nitrile rubber; styrene block copolymers (SIS, SEBS); silicone rubber; bulk molding compound (BMC); sheet molding compounding (SMC) or a crosslinked, glass-reinforced, polyester/polystyrene composition; and crosslinked dicyclopentadiene (Metton® RIM, Metton America, Inc, LaPorte, Tex., as described in more detail below.

In particular, in some embodiments, laminates are formed by adjoining a multilayer sheet of ionomer(s) and tie layer(s) to a backing layer by compression molding the multilayer sheet with the backing layer. In one embodiment, the backing layer, in substantially planar form, was produced in a separate process. This would be a particularly useful process to make an ionomer-clad laminate with what is known in the industry as "sheet molding compound" (crosslinkable, glass-reinforced, polyester/polystyrene composition in sheet form).

In another embodiment, the compression molding process is used to produce an ionomer-clad laminate of the multilayer sheet adjoined to fiber reinforced polymers such as fiber reinforced polypropylene.

In another embodiment, this process is used to produce directly a finished article using a multilayer sheet adjoined to a substrate of sheet molding compound by compression molding in matched-metal molds that have been machined to the shape of the desired finished article.

In some embodiments, laminates are formed by adjoining a multilayer sheet of ionomer(s) and tie layer(s) to a backing layer by spray techniques whereby the backing layer material is sprayed onto the tie layer side of the multilayer sheet of ionomer(s) and tie layer(s). In one embodiment, the backing layer material is sprayed in a molten form onto the tie layer side of the multilayer sheet. In another embodiment, the backing layer, which has not been completely reacted, is sprayed in liquid form onto the tie layer side of the multilayer sheet and reaction completed in a subsequent process step. In another embodiment, this process is used to produce directly a composite article comprising the multilayer sheet and the substrate material, which has not been completely reacted, sprayed onto the tie layer side of the multilayer sheet and reaction completed in a subsequent process step. In another embodiment, this process is used to produce directly a finished article comprising the multilayer sheet and the substrate material, which has not been completely reacted, sprayed onto the tie layer side of the multilayer sheet and reaction completed in a subsequent shaping process step.

In some embodiments, laminates are formed by adjoining a multilayer sheet of ionomer(s) and tie layer(s) to a backing layer by adhesive bonding. This would be a particularly useful process to make an ionomer-clad laminate comprising a multilayer sheet of ionomer(s) and tie layer(s) adhesively bonded to a sheet of cured rubber. The cured rubber sheet can be produced from natural rubber, general purpose rubbers, isobutylene-based elastomers including butyl rubbers based on isobutylene with isoprene and other monomers, and copolymers of isobutylene with alkylstyrene and other monomers, including the halogenated versions of the aforementioned elastomers, chlorosulfonated polyethylene rubbers, nitrile rubbers, silicone rubbers or mixtures thereof.

In one embodiment, a laminate is formed by adjoining a multilayer sheet of ionomer(s) and tie layer(s) to a backing layer of crosslinked dicyclopentadiene using a compression molding process. In this embodiment, the backing layer of crosslinked dicyclopentadiene was produced in a separate process.

In one embodiment, a composite article is formed by adjoining a multilayer sheet of ionomer(s) and tie layer(s) to a substrate layer of crosslinked dicyclopentadiene using a compression molding process. In this embodiment, the substrate layer of crosslinked dicyclopentadiene was produced in a separate process.

In one embodiment, a finished article is formed by adjoining a multilayer sheet of ionomer(s) and tie layer(s) to a substrate layer of crosslinked dicyclopentadiene using an adhesive. In this embodiment, the substrate layer of crosslinked dicyclopentadiene was produced to the desired shape of the finished article in a separate process.

In one embodiment, a finished article is formed by using an adhesive to adjoin a multilayer sheet of ionomer(s) and tie layer(s) to a substrate that is an article produced by the reactive injection molding of a urethane. In this embodiment, the article to which the multilayer sheet was adjoined was produced in the desired shape separately by the reactive injection molding process. In another embodiment, the reactive injection molded article is reinforced with one or more reinforcing fillers such as glass, polyaramide, wollastonite or other mineral fillers and the like.

In one embodiment, a finished article is formed by using an adhesive to adjoin a multilayer sheet of ionomer(s) and tie layer(s) to a substrate that is an article produced from sheet molding compound or bulk molding compound. In this embodiment, the article to which the multilayer sheet was adjoined was produced in the desired shape separately by a molding process performed on the sheet molding compound or bulk molding compound.

The aforementioned examples are provided for illustration and one skilled in the art will appreciate the numerous variations possible using such methods and techniques well-known in the art. In no way are they intended to limit the scope of the claimed invention unless affirmatively recited in the claims.

Regardless of the method to form the laminate, the final laminate may have any number of layers of ionomer and/or tie-layer materials. Embodiments of the laminate include one ionomer layer and one tie-layer. Another embodiment includes two layers of ionomer and a tie-layer. In yet another embodiment, the laminate includes two layers of ionomer and two tie-layers. In yet another embodiment of the laminate, there may be two layers of ionomer and a blend of tie-layer and substrate materials.

The final laminate may have any number of layers of ionomer and tie-layer materials. In one embodiment, the laminate is two layers, three in another embodiment, and four layers in yet another embodiment. In one embodiment, the ionomer layer or layers, prior to thermoforming, are from 13 μm to 1 mm. In another embodiment, the pre-thermoformed ionomer layer or layers is from 25 μm to 380 μm. In yet another embodiment, the pre-thermoformed ionomer layer is from 200 μm to 380 μm. The tie-layer can be of comparable thickness ranges, making the overall thickness of the laminate from 100 μm to 5 mm in one embodiment, or from 250 μm to 3 mm in yet another embodiment.

Additionally, one skilled in the art will recognize that the viscosity of each material to be extruded in adjoining layers should be closely matched to each other, at their respective processing temperatures, to achieve the targeted visual properties such as gloss level and "flop" if needed, and interlayer bonding. This condition is especially true when there are three or more layers in the laminate. In some embodiments with only two layers, the viscosity of the higher viscosity, adjoining layer is within less than 100% greater than the viscosity of the lower viscosity, adjoining layer. In other embodiments with only two layers, the viscosity of the higher viscosity, adjoining layer is within less than 50% greater than the viscosity of the lower viscosity, adjoining layer. In other embodiments with only two layers, the viscosity of the higher viscosity, adjoining layer is within less than 25% greater than the viscosity of the lower viscosity, adjoining layer. Ideally, the viscosities of the two layers are essentially identical at their respective process temperatures. In embodiments involving three or more layers, the principles for two-layer systems are applied in sequence to each pair of adjoining layers.

Laminate Shaping Process

A shaped laminate may be produced by any suitable means known in the art. Thermoforming, vacuum forming, and blow molding are desirable embodiments.

Thermoforming is a process of forming at least one pliable plastic sheet into a desired shape. Methods of thermoforming are well known in the art. For example, see McDonald, Joseph N., *Thermoforming*, ENCYCLOPEDIA OF POLYMER SCIENCE AND ENGINEERING, VOL. 16, John Wiley & Sons, 807-832 (New York 1989). In an embodiment of the present invention, the laminate that is formed from the at least one ionomer layer and tie-layer are thermoformed into a desirable shape, typically resembling the end use article. For illustration, an embodiment of the thermoforming sequence is described. First, a piece of the laminate, cut to the appropriate size, is placed on a shuttle rack to hold it during heating. The shuttle rack indexes into the oven which pre-heats the film before forming. Once the piece of the laminate is heated, the shuttle rack indexes back to the forming tool. The piece of the laminate is then vacuumed onto the forming tool to hold it in place and the forming tool is closed. The forming tool can be either a "male" or "female" type tool. The tool stays closed to cool the shaped laminate and the tool is then opened. The shaped laminate is then removed from the tool.

In certain embodiments, blow molding is a suitable laminate forming means, which includes injection blow molding, extrusion blow molding, and stretch blow molding. Blow molding is described in more detail in, for example, CONCISE ENCYCLOPEDIA OF POLYMER SCIENCE AND ENGINEERING 90-92 (Jacqueline I. Kroschwitz, ed., John Wiley & Sons 1990). One skilled in the art will know the appropriate processing conditions to use for blow molding. See, for example, WO 02/078953.

Composite Article Formation

Formation of the composite article may be achieved by any suitable means known to those skilled in the art. Illustrative examples include blow molding, adhesive bonding, transfer molding, cast molding, cold forming, matched-die molding, injection molding, spray techniques, or combinations thereof. See, for example, WO 02/078953 A and WO 02/078954 A.

In one embodiment, these materials are coextruded in a multilayer die, then passed over at least two chill rolls and a sheet conveyor. This cooled sheet is then cut to size and/or rolled. Sheets taken from this cooled material can then be placed on a thermoforming rack and thermoformed to conform substantially to the shape of an injection molding tool, followed by cooling of the shaped laminate, and trimming of the cooled shaped laminate to prepare it for use in forming the shaped composite article. This trimmed, shaped laminate is then placed into the injection molding tool exposing at least one layer of the tie-layer, in particular, the backing layer, in order to allow the tie-layer to be secured to the substrate material to be injected. Hence, the substrate material in molten form is then injected into the tool, forming a cohesive unit with the shaped laminate. The part that results is a composite article having the desired shape and geometry of the end use article.

In an embodiment of the injection molding process, wherein a substrate material is injection molded into a tool into which the shaped laminate has been placed, the melt temperature of the substrate material is between 230° C. and 255° C. in one embodiment, and between 235° C. and 250° C.

in another embodiment, the fill time from 2 to 10 seconds in one embodiment, from 2 to 8 seconds in another embodiment, and a tool temperature of from 25° C. to 65° C. in one embodiment, and from 27° C. and 60° C. in another embodiment. In a desirable embodiment, the substrate material is at a temperature that is hot enough to melt the tie-layer material or backing layer to achieve adhesion between the layers. Some substrate materials may require substantially different processing temperatures well known in the art.

For example, many of the substrate materials cited above can be injection molded into finished articles with a composite laminate on the surface that would be visible when used to make the intended device. These include acrylic polymers, such as acrylonitrile-ethylene-styrene (AES), acrylonitrile-styrene-acrylate (ASA), polymethacrylate acrylonitrile butadiene styrene (MABS), and polymethylmethacrylate (PMMA); engineering thermoplastics such as polyaryletherketone (PAEK), polybenzimidazole, polyetherketone (PEK), polyethersulfone (PES), polyimidesulfone (PIS), polyphenylsulfone (Radel™, Solvay); polyamides such as amorphous polyamides (made from mixed diacids, mixed diamines, or both), polyamides compounds that are impact modified with acid and/or anhydride containing polymers or rubbers, and polyamide elastomers (Pebax™ from Atofina, Philadelphia, Pa., Vestamid™ from Degussa, Parsippany, N.J.); polyesters such as liquid crystal polymers (LCP), polyarylate (amorphous, aromatic polyester), polybutylene naphthalate (PBN), polybutylene terephthalate (PBT), polyethylene naphthalate (PEN), polyester elastomers (such as Hytrel™ from DuPont, Riteflex™ from Ticona, Summit, N.J., Keyflex® BT from Harvest Polymers, Farnham, United Kingdom and similar products), copolyester (PETG: cyclohexane dimethanol copolyester, and other chemistries); some elastomers such as dynamically vulcanized alloys (Santoprene™ and Geoplast™ from Advanced Elastomer Systems, Akron, Ohio, Keltalloy™ from Alliance Alloys, Leominster, Mass., NexPrene™ from Harvest Polymers, Farnham, United Kingdom and similar products), and styrene block copolymers (SIS, SEBS); styrenic polymers such as polystyrene, syndiotactic polystyrene, high impact polystyrene (HIPS), and polystyrene maleic anhydride (SMA); and cyclic olefin copolymer (COC).

In one embodiment, acrylic polymers are injection molded against an appropriate tie layer or backing side of a multilayer laminate to form a finished article. The injection molding conditions for acrylic polymers are well known in the art; for example, melt temperatures are typically in the range of 240° C. to 280° C. and mold temperatures are typically in the range of 40° C. to 80° C. Families of acrylic polymers and certain grades within those families that are designed to have higher heat resistance might require slightly higher melt and mold temperatures. Conversely, families of acrylic polymers and certain grades within those families that have less heat resistance might be readily injection moldable at slightly lower melt temperatures and allow lower mold temperatures to be used.

In one embodiment, engineering thermoplastic polymers are injection molded against an appropriate tie layer or backing side of a multilayer laminate to form a finished article. The injection molding conditions for engineering thermoplastics are well known in the art; for example, melt temperatures are typically in the range of 280° C. to 350° C. and mold temperatures are typically in the range of 100° C. to 150° C. These materials generally need to be dried prior to injection molding to prevent visual and physical defects in the molded parts. Typical drying conditions are 4 to 12 hours at 100° C. to 150° C. in a recirculating air dryer with some provision for removing the moisture from the recirculating air. The moisture can be removed from the recirculating air using desiccant beds or mechanical refrigeration units or other appropriate means. Alternatively, vacuum dryers operating in similar temperature ranges can be used.

Families of engineering thermoplastic polymers and certain grades within those families, that are designed to have higher heat resistance, might require slightly higher melt and mold temperatures. Conversely, families of engineering thermoplastic polymers and certain grades within those families, that have less heat resistance, in particular those that are alloys with polymers that can be injection molded at lower temperatures, might be readily injection moldable at slightly lower melt temperatures and allow lower mold temperatures to be used.

The relatively high melt and mold temperatures required to injection mold engineering thermoplastics often necessitates very specialized, molding machines and molds and the development of a lot of processing technology to fabricate finished articles. Mold temperatures on the side of the mold against which the ionomer surface of the multilayer sheet is placed will need to be operated at considerably lower temperatures than the other side of the mold to assure the ionomer layer(s) are solidified when the part is ejected. Because the multilayer sheet is a good thermal insulator, the mold temperature on that part of the mold can be a lot lower than the side of the mold in contact with the engineering thermoplastic with out resulting in solidification of the molten engineering thermoplastic too early in the molding process. The multilayer sheet will be heated by the high temperature, engineering thermoplastic polymer melt as it flows into the mold. The increase in temperature of the multilayer sheet will cause it to soften and become deformable. Care must be exercised during the filling step of the injection molding process to prevent the multilayer sheet from being dislodged by the flow of the engineering thermoplastic polymer.

In one embodiment, polyamide polymers are injection molded against an appropriate tie layer or backing side of a multilayer laminate to form a finished article. The injection molding conditions for polyamides are well known in the art; for example, melt temperatures are typically in the range of 240° C. to 320° C. and mold temperatures are typically in the range of 50° C. to over 100° C. These materials need to be dried prior to injection molding to prevent degradation of the polyamide and also visual and physical defects in the molded parts. Typical drying conditions are 4 to 12 hours at 80° C. to 140° C. in a recirculating air dryer with some provision for removing the moisture from the recirculating air. The moisture can be removed from the recirculating air using desiccant beds or mechanical refrigeration units or other appropriate means. Alternatively, vacuum dryers operating in similar temperature ranges can be used. Families of polyamide polymers and certain grades within those families that are designed to have higher heat resistance might require slightly higher melt and mold temperatures. Conversely, families of polyamide polymers and certain grades within those families that have less heat resistance might be readily injection moldable at slightly lower melt temperatures and allow lower mold temperatures to be used.

In one embodiment, polyester polymers are injection molded against an appropriate tie layer or backing side of a multilayer laminate to form a finished article. The injection molding conditions for polyesters are well known in the art; for example, melt temperatures are typically in the range of 240° C. to 320° C. and mold temperatures are typically in the range of 50° C. to over 100° C. These materials generally need to be dried prior to injection molding to prevent degradation of the polyester and also visual and physical defects in the molded parts. Typical drying conditions are 4 to 12 hours at 80° C. to 150° C. in a recirculating air dryer with some provision for removing the moisture from the recirculating air. The moisture can be removed from the recirculating air using desiccant beds or mechanical refrigeration units or other appropriate means. Alternatively, vacuum dryers operating in similar temperature ranges can be used. Families of polyester polymers and certain grades within those families that are designed to have higher heat resistance might require slightly higher melt and mold temperatures. Conversely, families of polyester polymers and certain grades within those families that have less heat resistance might be readily injection moldable at slightly lower melt temperatures and allow lower mold temperatures to be used.

The relatively high melt and mold temperatures required to injection mold some polyesters often necessitates very specialized molding machines and molds and the development of a lot of processing technology to fabricate finished articles. Mold temperatures on the side of the mold against which the ionomer surface of the multilayer sheet is placed will need to be operated at considerably lower temperatures than the other side of the mold to assure the ionomer layer(s) are solidified when the part is ejected. Because the multilayer sheet is a good thermal insulator, the mold temperature on that part of the mold can be a lot lower than the side of the mold in contact with the engineering thermoplastic with out resulting in solidification of the molten engineering thermoplastic too early in the molding process. The multilayer sheet will be heated by the high temperature, polyester polymer melt as it flows into the mold. The increase in temperature of the multilayer sheet will cause it to soften and become deformable. Care must be exercised during the filling step of the injection molding process to prevent the multilayer sheet from being dislodged by the flow of the polyester polymer.

The aforementioned examples are provided for illustration and one skilled in the art will appreciate the numerous variations possible using such methods and techniques well-known in the art. In no way are they intended to limit the scope of the claimed invention unless affirmatively recited in the claims.

It will be understood by those skilled in the art that the steps outlined above may be varied, depending upon the desired result. For example, the coextruded sheet of layered ionomer and tie-layer may be directly thermoformed without cooling, thus skipping a cooling step. Other parameters may be varied as well in order to achieve a finished composite article having desirable features.

In another embodiment, the invention is a composite article including at least one layer of ionomer material, a tie-layer securable to a substrate material, and a substrate material secured to the tie-layer, the tie layer comprising at least one backing layer secured to the substrate, and wherein the backing layer comprises a blend of a tie-layer material and a substrate material. The at least one ionomer layer may further include both a surface layer and a sub-surface layer that is secured to the tie-layer. The surface ionomer layer is desirably clear or non-pigmented and have a thickness of from 75 to 150 µm, alternatively at least 100 µm. The substrate material may have a 1% secant flexural modulus of greater than 100 MPa.

INDUSTRIAL APPLICATIONS

The laminates and composite articles of the present invention can be used in various applications. They may be used in interior and exterior components of appliances such as clothing or dish washer exteriors, refrigerator door exteriors, refrigerator door interiors, refrigerator liners, refrigerator housings.

The laminates and composite articles of the present invention can also be applied in construction. Some examples include tubs and showers, liners for tubs and showers, counter tops, floor coatings, laminated surface counter tops, polymer/wood composites, prefabricated building materials, sidings, sinks and sink liners, synthetic marble panels, translucent glass replacements, vinyl tiles, wall covering, and wood replacements for decks.

Additionally, the laminates and composite articles of the present invention have utility in electronics for CDs and DVDs as well as for housing on TVs, VCRs, computers, and stereos.

The laminates and composite articles of the present invention may also be used in a variety of sporting equipment and parts. Illustrative examples include boats, hulls, boat hulls, marine boat hulls/canoe interiors and exteriors, boat covers, boat sails, jet skis (housings), skis, snowboards, snowmobiles, sports helmets, stadium seats, surfboards, helmets, and tent materials.

In other applications, the present invention is applied to exterior or interior automotive parts. Illustrative examples include vehicular parts, automotive parts, airbag doors, doors, automotive door panels (interior and exterior), body chassis, body panels, bumpers, deck lids, fenders, hoods, rocker panels, mirror housings, dashboards, instrument panels, fuel tanks, grills, hopper cars, interior trims, pillar trims, cup holders, personal containers, and wheel covers. Applications within this category also include other minor components of any 2, 3, 4 or more wheeled vehicles including farm tractors; lawn and garden tractors; lawn mowers; large trucks; bicycles; toy wagons; parts for All Terrain Vehicles (ATVs); parts for motorcycles such as fuel tanks; scooters; seat covers; helmets, and trims. They may also be used as protective and anti-icing surfacing for airplanes, helicopters, rockets, and shuttles.

The inventive laminates and composite articles may be used in lawn, yard, and garden applications as well. Some examples are lawn/outdoor furniture, pool liners and covers, outdoor ornaments, and bird houses.

The inventive laminates and composite articles may also be used in cable jacketing, children's toys, clothing/fabric (combined with non-wovens), Gamma-radiation resistant applications, GORETEX™, luggage, and other applications for coating plastics and metals where a dull or glossy and a scratch resistant surface is desirable such as plastic microwaveable cookware, plastic paper goods, reflective signage and other reflective articles on roads and clothing, and wheels on in-line skates.

The aforementioned industrial applications may be combined with any of the embodiments described in the SUMMARY as well as any embodiments as claimed.

While the present invention has been described and illustrated by reference to particular embodiments, those of ordinary skill in the art will appreciate that the invention lends itself to many different variations not illustrated herein. For these reasons, then, reference should be made solely to the appended claims for purposes of determining the true scope of the present invention.

Terms that are or may be trademarked in some jurisdictions are used in the description. These terms are written in all capital letters, and is understood to recognize such trademarks. For brevity, markings such as "™" or "®" have not been used.

All priority documents are herein fully incorporated by reference for all jurisdictions in which such incorporation is permitted. Further, all documents cited herein, including testing procedures, publications, patents, journal articles, etc., are herein fully incorporated by reference for all jurisdictions in which such incorporation is permitted and only to the extent such disclosures are consistent with the description as herein provided.

Further, all documents, but not priority patent applications and patents, cited herein, including testing procedures, publications, patents, journal articles, etc., are herein fully incorporated by reference for all jurisdictions in which such incorporation is permitted and only to the extent such disclosures are consistent with the description as herein provided.

What is claimed is:

1. A laminate comprising:
    an ionomer layer, wherein the ionomer layer comprises a first ionomer layer and a second ionomer layer and wherein one or both of the first ionomer layer and the second ionomer layer is pigmented, natural color, or clear, wherein the first ionomer layer comprises a blend of: (a) 45 to 95 wt % of a first ionomer having a melt index ($MI_{190/2.16}$) of from 0.6 to 1.0 dg/min; and (b) a second ionomer having a melt index ($MI_{190/2.16}$) of from 2.1 to 3.0 dg/min and the first ionomer has a different metallation than the second ionomer;
    a tie layer comprising at least one coextrudable tie resin selected from an epoxy containing copolymer and a copolymer of one or more $C_2$-$C_{10}$ α-olefin and one or more ethylenically copolymerizable amine-containing monomer of the general formula:

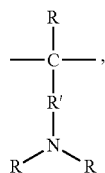

wherein each R is independently H or a $C_1$ to $C_{10}$ hydrocarbon and R' is a bond or a $C_1$ to $C_{10}$ hydrocarbon, and wherein the coextrudable tie resin has a melt index ($MI_{190/2.16}$) of about 2.0 to about 10 dg/min; and
    a backing layer comprising a blend of said at least one coextrudable tie resin and at least one of a polyamide polymer, a polyamide compound, a polyamide elastomer, an acrylic polymer, an elastomer, a styrenic polymer, a copolymer containing cyclic monomer(s), a polyurethane polymer, or mixtures thereof;
wherein the tie-layer is disposed between the ionomer layer and the backing layer.

2. The laminate of claim 1, wherein the backing layer comprises at least one polyamide compound that comprises amorphous polyamides.

3. The laminate of claim 1, wherein the backing layer comprises at least one acrylic polymer that comprises acrylonitrile-ethylene-styrene, acrylonitrile-styrene-acrylate, polymethacrylate acrylonitrile butadiene styrene, polyacrylonitrile, polymethylmethacrylate, or mixtures thereof.

4. The laminate of claim 1, wherein the backing layer comprises at least one polyurethane polymer that comprises at least one reactive injection molding compound or at least one reinforced reactive injection molding compound.

5. The laminate of claim 1, wherein the backing layer comprises at least one elastomer that comprises natural rubber, a copolymer of isobutylene and isoprene, a copolymer of isobutylene and an alkylstyrene, a halogenated copolymer of isobutylene and isoprene, a halogenated copolymer of isobutylene and an alkylstyrene, polyisobutylene, chlorosulfonated polyethylene, a dynamically vulcanized alloy, nitrile rubber, a styrene block copolymer, or mixtures thereof.

6. The laminate of claim 1, wherein the said backing layer additionally comprises a styrenic polymer that comprises polystyrene, syndiotactic polystyrene, high impact polystyrene, polystyrene maleic anhydride, or mixtures thereof.

7. The laminate of claim 1, wherein the said backing layer comprises a copolymer containing cyclic monomer(s) selected from cyclohexene, norbornene, dicyclopentadiene or mixtures thereof.

8. The laminate of claim 1, wherein the ionomer layer comprises a zinc-neutralized ionomer, a sodium-neutralized ionomer, or a mixture thereof.

9. A composite article comprising the laminate of claim 1 and further comprising:
    a substrate layer comprising at least one copolymer containing cyclic monomer(s) selected from cyclohexene, norbornene, dicyclopentadiene, or mixtures thereof;
wherein the backing layer is disposed between the tie-layer and the substrate layer.

10. The composite article of claim 9, wherein the substrate layer additionally comprises at least one polyamide compound that comprises amorphous polyamides.

11. The composite article of claim 9, wherein the substrate layer additionally comprises at least one polyurethane polymer that comprises at least one reactive injection molding compound or at least one reinforced reactive injection molding compound.

12. The composite article of claim 9, wherein the substrate layer additionally comprises at least one elastomer that comprises natural rubber, a copolymer of isobutylene and isoprene, a copolymer of isobutylene and an alkylstyrene, a halogenated copolymer of isobutylene and isoprene, a halogenated copolymer of isobutylene and an alkylstyrene, polyisobutylene, chlorosulfonated polyethylene, a dynamically vulcanized alloy, nitrile rubber, a styrene block copolymer, or mixtures thereof.

13. The composite article of claim 9, wherein the substrate layer additionally comprises a styrenic polymer that comprises polystyrene, syndiotactic polystyrene, high impact polystyrene, polystyrene maleic anhydride, or mixtures thereof.

14. The composite article of claim 9, wherein the ionomer layer comprises a zinc-neutralized ionomer, a sodium-neutralized ionomer, or a mixture thereof.

15. The composite article of claim 9, wherein the substrate is a blend.

16. The composite article of claim 9, wherein the thickness of the composite article is from 200 μm to 6 mm.

17. A vehicle, an appliance, an automotive part, or a boat hull comprising the composite article of claim 9.

* * * * *